W. A. ATWOOD.
LOADING ATTACHMENT FOR AUTOMOBILES.
APPLICATION FILED JULY 20, 1916.
1,237,448.
Patented Aug. 21, 1917.
3 SHEETS—SHEET 3.
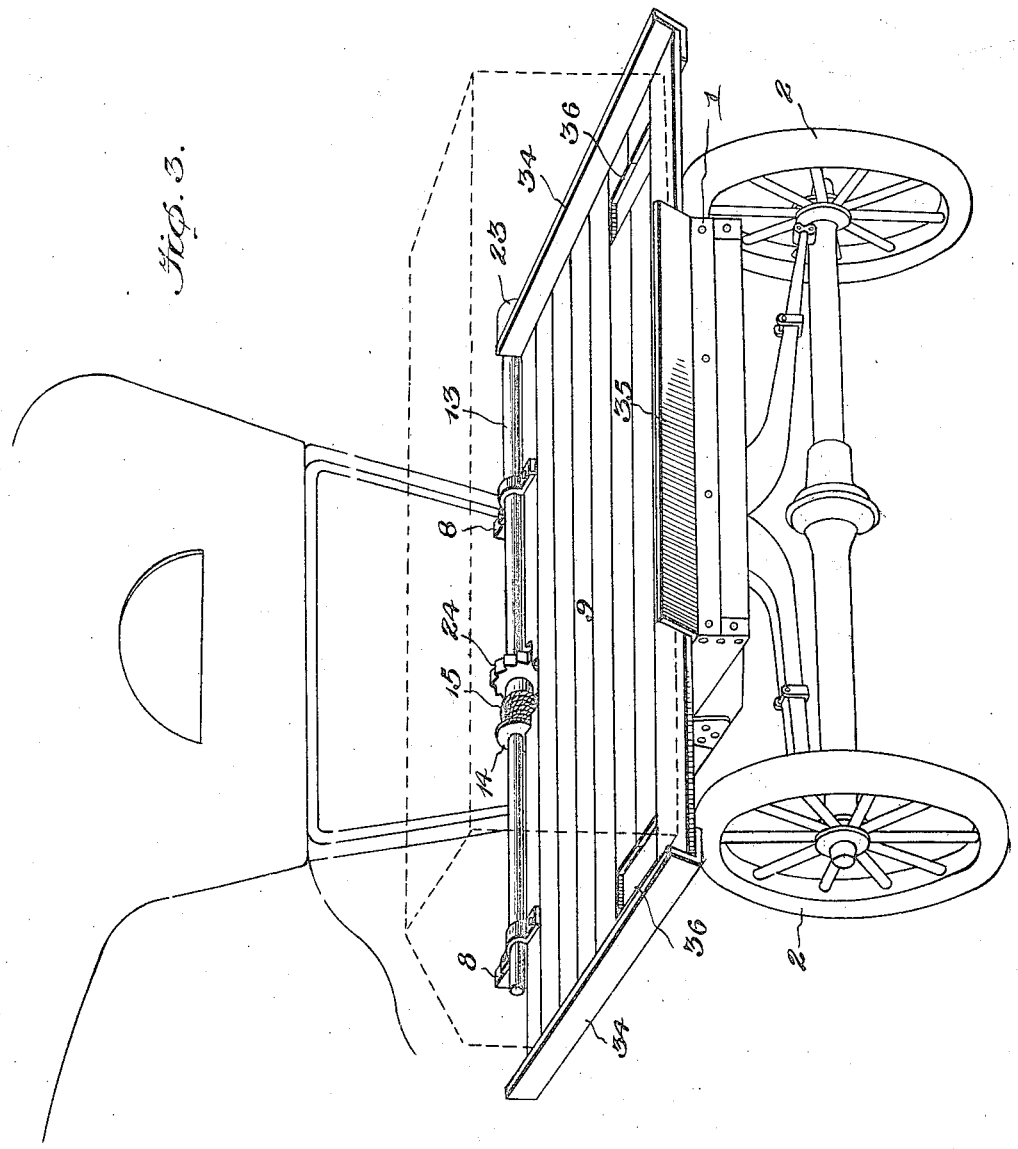

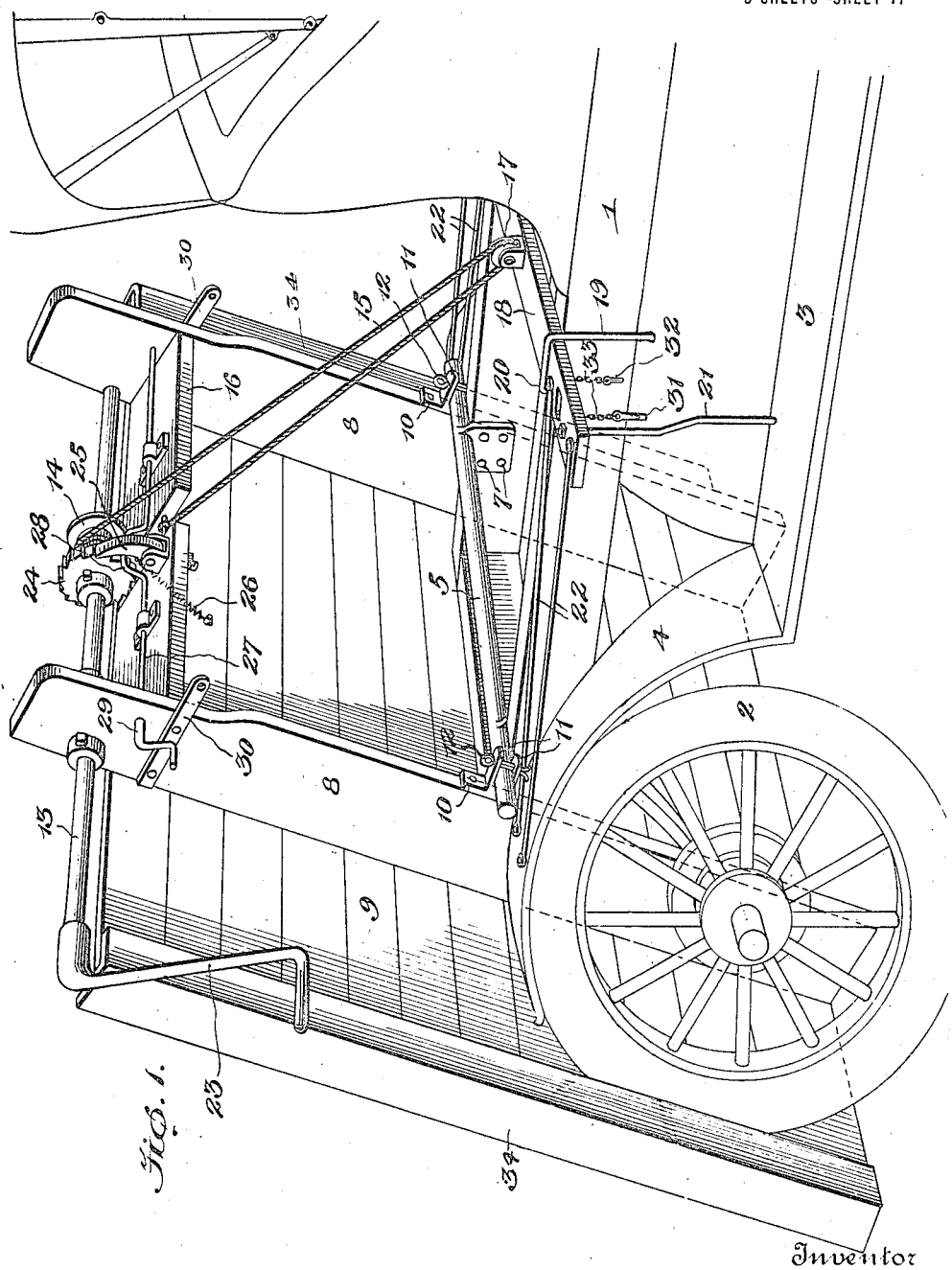

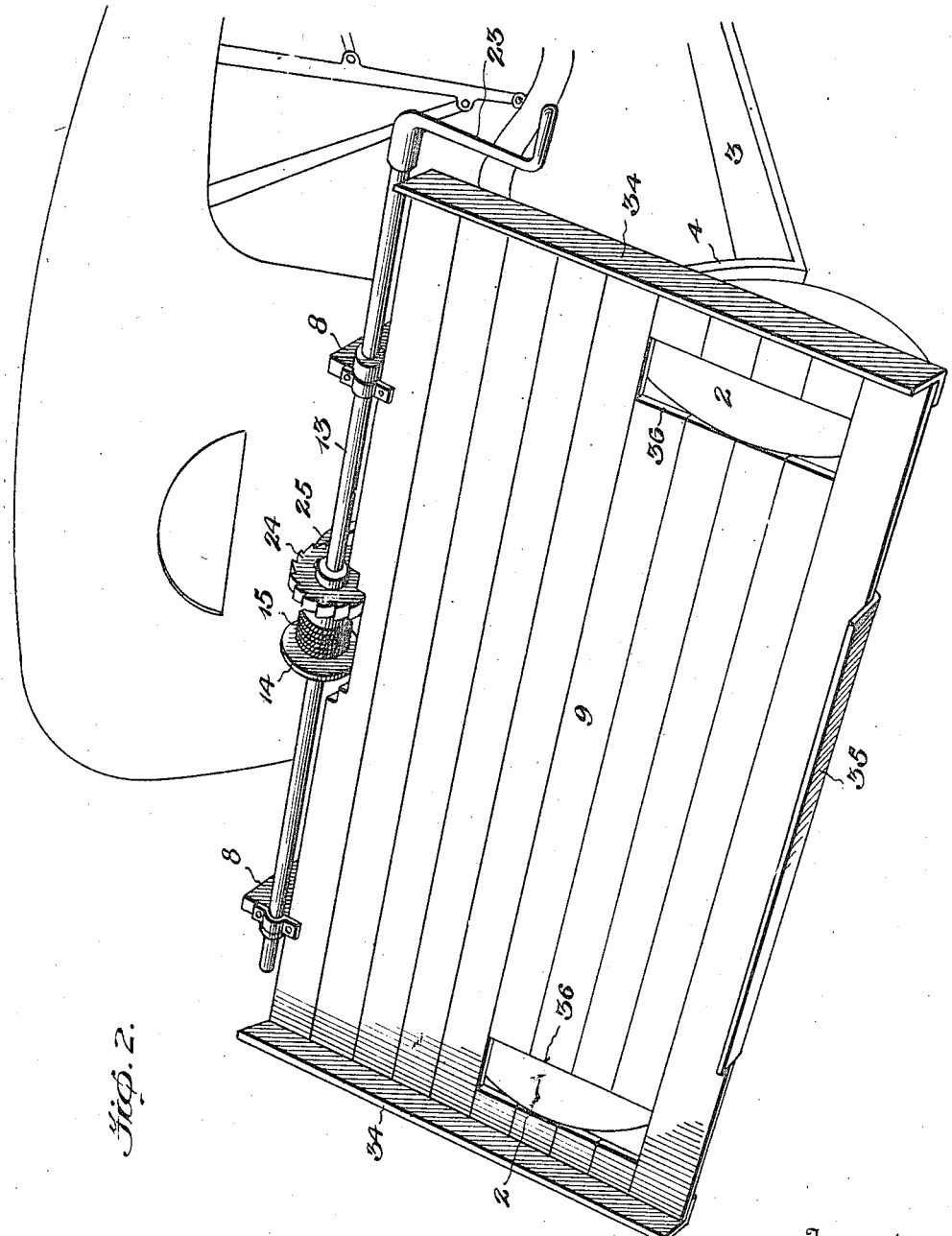

UNITED STATES PATENT OFFICE.

WALDO A. ATWOOD, OF VILLISCA, IOWA.

LOADING ATTACHMENT FOR AUTOMOBILES.

1,237,448.  Specification of Letters Patent.  Patented Aug. 21, 1917.

Application filed July 20, 1916. Serial No. 110,350.

*To all whom it may concern:*

Be it known that I, WALDO A. ATWOOD, a citizen of the United States, residing at Villisca, in the county of Montgomery and State of Iowa, have invented certain new and useful Improvements in Loading Attachments for Automobiles; and I do declare the following to be a full, clear, and exact description of the invention, such as will enable others skilled in the art to which it appertains to make and use the same.

My invention relates to improvements in loading and unloading devices and has for its object to provide simply constructed means of this class which is readily applicable to automobiles and other vehicles for easily loading and unloading heavy boxes, crates and the like.

With the foregoing general object in view, the invention resides in certain novel features of construction and in unique combinations of parts to be hereinafter fully described and claimed, the descriptive matter being supplemented by the accompanying drawings which constitute a part of this application and in which:

Figure 1 is a perspective view of the improved loader applied to an automobile, showing said loader tilted rearwardly;

Fig. 2 is a similar view looking from the rear of the machine; and,

Fig. 3 is a perspective view showing the loading platform in its normal position.

In specifically describing the structure shown in the drawings above briefly described, similar characters will be employed to designate corresponding parts throughout the several views and reference will be herein made to the numerous elements by their respective indices. To this end, the numeral 1 designates the frame of an automobile, 2 the rear wheels thereof, 3 the running boards, and 4 the rear fenders.

Disposed over the rear end of the frame 1 is a transverse horizontal hinge shaft 5 having a pair of depending attaching plates welded or otherwise secured thereto, said plates contacting with the outer faces of the side bars of the frame and being secured to said bars by bolts or the like 7. The sills 8 of a loading platform 9 are provided on their lower edges with bearings 10 which include fingers 11 straddling the ends of the shaft 5, removable pins 12 being passed through said fingers below the shaft for the purpose of forming a detachable connection.

A winding shaft 13 is rotatably mounted on the front ends of the sills 8 and carries a drum 14 upon which a cable 15 is adapted to be wound to tilt the platform forwardly to a horizontal position and to permit said platform to tilt rearwardly until it stands substantially upright. One end of the cable 15 is secured to a transverse bar or board 16 which extends between the front ends of the sills 8 while the other end of said cable is anchored to the drum 14, said cable being passed around a sheave 17 which is mounted at the center of a transverse bar 18 detachably secured to the frame 1 directly in rear of the driver's seat.

A pair of vertically disposed bolts 19 are secured at their lower ends to a suitable part of the vehicle and are provided at their upper ends with hooks 20 which take over the ends of the bar 18, which ends project beyond the frame 1. Vertical brace rods 21 are also provided, said rods being secured at their upper ends to the bar 18 and at their lower ends to the running boards 3. Additional brace rods 22 converge rearwardly from the ends of the bar 18 and are secured at their rear ends to the brackets of the fenders 4. By these features of construction, the bar 18 is rigidly secured in position yet it may be detached easily and when this is done, by simply removing the pins 12, the entire platform may be removed from the vehicle frame.

Any preferred means may be provided for rotating the shaft 13 but a detachable crank 23 is preferably employed. Also any suitable mechanism may be used to prevent retrograde movement of the shaft in question. For illustrative purposes, however, said shaft is shown as provided with a ratchet wheel 24 which coöperates with a dog 25 pivotally mounted on the bar 16. The dog 25 is normally moved to operative position by means of a suitable spring 26 but may be released at will by a rock shaft 27 mounted on the bar 16, said shaft having a central crank 28 which bears against the inner side of the dog and being equipped with an operating crank 29 at one end.

For holding the platform in lowered position, locking bolts 30 are secured to the front ends of the sills 8, these bolts being adapted for reception in openings in the ends of the bar 18 as shown in Fig. 1. Keys 31 are passed through the bolts 30 beneath the bar 18 and said keys are held against accidental removal by cotter pins 32, said pins and keys being attached to small chains 33 which depend from the bar 18.

The platform 9 preferably consists of a plurality of boards extending transversely of the machine and bolted or riveted at their ends to the horizontal flanges of angle metal side bars 34, this construction being durable and efficient regardless of its simplicity; it being obvious that the vertical flanges of the bars 34 serve to form sides for the platform to retain boxes and the like thereon. The rear edge of the platform 9 is provided with a loading plate 35 adapted to be forced under the load while it rests on the ground, and for the purpose of permitting the platform to tilt rearwardly to the necessary extent for allowing said plate to operate in this manner, the platform is preferably provided with a pair of openings 36 which take over the rear wheels as shown in Fig. 1.

In operation, with the platform standing in its normal horizontal position, the pins 32 and keys 31 may be removed, and by actuating the crank 29 the dog 25 will be released. This will permit the shaft 13 to rotate freely to pay out the cable 15, thus permitting the platform 9 to assume a substantially upright position with the loading plate 35 resting on the ground or street. The box or the like to be loaded is now tilted rearwardly to permit the loading plate to be inserted beneath it and is then rocked forwardly until it rests on the platform 9. The drum 14 is now rotated by means of the shaft 13 and crank 23 to wind the cable 15, thus returning the platform to its normal position, in which position it is locked by means of the keys 31 and pins 32. The unloading operation is of course the reversal of the loading and may be performed with equal ease.

The improved loading attachment is adapted primarily for application to automobiles and is well fitted for loading and unloading pianos, but it is to be understood that it may well be employed in connection with other types of vehicles and can be used for any purpose to which it is applicable.

In the foregoing I have described certain specific details for accomplishing probably the best results and in the accompanying drawings, these details have been illustrated. It is to be understood, however, that within the scope of the invention as claimed, numerous changes may be made without sacrificing the principal advantages thereof.

I claim:

A load carrying attachment for automobiles comprising a pair of parallel sills to extend longitudinally of the vehicle frame and means for hinging said sills between their ends to said frame, a platform secured to the upper sides of said sills, a transverse bar extending between the front ends of said sills, a rotary shaft extending through said front ends of the sills in advance of said bar, a drum and a ratchet wheel secured to said shaft, a dog pivotally mounted on said bar for coöperation with said ratchet wheel in holding said shaft against retrograde movement, a rock shaft mounted on said bar for releasing said dog, a second transverse bar in advance of the sill hinges and means for securing it in place on the vehicle frame, said second named bar carrying a sheave and receiving the front ends of said sills on its ends, a cable passing around said sheave and secured at one end to said first named bar and at its other end to said drum, and means for locking the front ends of said sills to said second bar.

In testimony whereof I have hereunto set my hand in the presence of two subscribing witnesses.

WALDO A. ATWOOD.

Witnesses:
F. L. INGMAN,
S. H. COLEMAN.